United States Patent [19]

Suzuki et al.

[11] 3,864,312

[45] Feb. 4, 1975

[54] PROCESS FOR PRODUCING A CATIONIC CARBAMOYL POLYMER PREPARED BY AMINOALKYLATION OF CARBAMOYL POLYMER IN MIXTURE OF WATER AND WATER-MISCIBLE ORGANIC SOLVENT

[75] Inventors: Mamoru Suzuki; Eiichi Hirata; Sigenori Taziri, all of Osaka, Japan

[73] Assignee: Sumitomo Chemical Company, Limited, Osaka, Japan

[22] Filed: May 10, 1973

[21] Appl. No.: 358,998

[30] Foreign Application Priority Data
May 11, 1972 Japan.................................. 47-47016

[52] U.S. Cl.......... 260/67.5, 210/54, 260/29.4 UA, 260/39 SB, 260/67.6 R, 260/72 R
[51] Int. Cl............................ C08g 9/04, C08g 9/24
[58] Field of Search............ 260/72 R, 67.5, 67.6 R

[56] References Cited
UNITED STATES PATENTS

| | | | |
|---|---|---|---|
| 2,328,901 | 9/1943 | Grimm et al........................ | 260/72 |
| 3,323,979 | 6/1967 | Foster et al....................... | 260/72 X |
| 3,539,535 | 11/1970 | Wisner................................ | 260/72 |
| 3,790,529 | 2/1974 | Fujimura et al. .................... | 260/72 |

OTHER PUBLICATIONS

Chem. Abstracts, Vol. 72, 1970, 13403v, Matsunaga, et al.

Chem. Abstracts, Vol. 78, 1973, Tanaka et al., 85290c.

*Primary Examiner*—Howard E. Schain
*Attorney, Agent, or Firm*—Stewart and Kolasch, Ltd.

[57] ABSTRACT

A powdered cationic carbamoyl polymer, useful as a flocculant for the treatment of organic slurried waste waters, is prepared by the aminoalkylation of a carbamoyl polymer in a mixture of water and an organic solvent which is miscible with water and not capable of dissolving the carbamoyl polymer.

12 Claims, No Drawings

PROCESS FOR PRODUCING A CATIONIC CARBAMOYL POLYMER PREPARED BY AMINOALKYLATION OF CARBAMOYL POLYMER IN MIXTURE OF WATER AND WATER-MISCIBLE ORGANIC SOLVENT

The present invention relates to a process for producing cationic carbamoyl polymers. More particularly, it relates to a process for producing powdered cationic carbamoyl polymers which are soluble in water and of a high molecular weight.

A cationic high molecular weight flocculant has been considered to be one of the most ideal flocculants from the viewpoint of the mechanism of flocculation, and cation-modified polyacrylamides particularly show superior qualities in practical use. However, it is difficult to make the polyacrylamides in powder form and to provide a high molecular weight polymer thereof, and, in addition, problems arise as to the stability of the product. Because of these reasons, the polymers are place on the market in the form of an about 5 percent aqueous dilute solution, which still has disadvantages in the handling and stability thereof. Thus, stable, powdered cation-modified polyacrylamide resins have been needed in the art.

Previous developments in this art have so far been disclosed in Japanese Patent Publication Nos. 8226/1969 and 20994/1969. However, the process of Japanese Patent publication No. 8226/1969 which comprises polymerizing acrylamide in solvents of acetic acid esters containing a small amount of water and immediately aminoalkylating the resulting suspension of polyacrylamide to give cation-modified polymers, has a disadvantage that a poor compatibility between water and acetic acid esters limits the amount of water uniformly dissolved to below about 5 percent so that the formation of swelled polymer is not sufficient and the reaction velocity of the aminoalkylation is extremely low, with the result that the degree of modification is unsatisfactory. On the other hand, raising the temperature to increase the reaction velocity causes the formation of gelled polymer.

The process of Japanese Patent Publication No. 20994/1969 which comprises aminoalkylating polyacrylamide in a system wherein an aqueous solution thereof is suspended in liquid aromatic hydrocarbons or saturated aliphatic hydrocarbons which are not miscible with water and removing the water by an azeotropic distillation from the system to give powdered cation-modified polymers, also has a disadvantage that an intimate contact between the reagents and the polyacrylamide is achieved only with difficulty, whereby an extremely low degree of cation-modification is obtained. Moreover, block-formation by aggregation of polymer particles occurs to a great extent during the condensation, and it is therefore difficult to obtain useful cation-modified polymers.

It has now been found that when a powdered polyacrylamide is suspended in a mixture of water and an organic solvent which is miscible with water and not capable of dissolving the polyacrylamide, to make a slurry, which is then subjected to amino alkylation, a cation-modified polymer can be obtained in a powder form under such a mild reaction condition as at room temperature without any change in the shape of the polymer particles.

According to the present invention, there is provided a process for producing solid (powdered) water-soluble cationic carbamoyl polymers, which comprises reacting a slurried high molecular weight carbamoyl polymer with formaldehyde and an amine or with an amine-formaldehyde adduct, the reaction being a so-called aminoalkylation reaction (Mannich Reaction), in a mixture of water and an organic solvent which is miscible with water and not capable of dissolving the carbamoyl polymer, and filtering the resulting slurry to collect the solid particles.

Examples of the organic solvent which are miscible with water and not capable of dissolving the carbamoyl polymer include methanol, ethanol, n-propanol, i-propanol, t-butanol, acetone, acetonitrile, ethyleneglycol, propyleneglycol, dioxane, methylcellosolve, ethylcellosolve and a mixtures thereof.

The mixed solvent employed in the reaction is a uniform mixture of water and at least one of the organic solvents mentioned above, and the water content therein may be from 20 to 70 percent by weight, preferably from 30 to 60 percent by weight.

The use of an excess of the organic solvent out of the said range will disadvantageously lower the rate of the aminoalkylation reaction. On the other hand, the use of an excess of water out of the said range may permit the reaction to proceed rapidly but promotes an over-swelling or over-dissolution of the resulting cationic polymer, whereby the block-formation by aggregation of the polymer particles appears, resulting in the difficult formation of the powdered polymer.

As the formaldehyde which is a reagent for the Mannich Reaction, there may be employed solid paraformaldehyde, trioxane, aqueous formalin or the like. The amine may be a primary or secondary one and, in view of the flocculating efficiency and the stability of the product, the use of a secondary amine (e.g., dimethylamine, diethylamine, dibutylamine, diethanolamine, methylaminoethanol, morpholine, piperidine) is preferable.

The carbamoyl polymer may be polyacrylamide, polymethacrylamide or a copolymer mainly consisting of acrylamide or methacrylamide as the monomeric unit.

The said polymer is used in a slurry form in the reaction. For example, the slurried polymer prepared by radical-type precipitation polymerization of a monomeric carbamoyl compound in the solvent/water system as mentioned above may be used as such. Further, for example, a powdered carbamoyl polymer prepared by any other method may be provided in a slurry form and then used in the reaction. In any case, the use of a polymer having an average molecular weight above one hundred thousand is preferred in view of the flocculating efficiency. The carbamoyl polymer content in the slurry is preferably from 10 to 30 percent by weight based on the total weight of the materials used, and the molar ratio of the carbamoyl polymer : formaldehyde : the amine may be within a range of 1.0 : 0.1 – 1.0 : 0.1 – 1.0.

The reaction may be carried out at 20° to 50°C under stirring to give readily a polymer having 5 to 50 percent by mol of the degree of Mannich modification (indicating the proportion of the aminoalkylated amide groups to the total amide groups). The reaction time depends on the reaction temperature and is usually from 1 to 5 hours. In carrying out the reaction, the amine may preferably be used in an equimolar or excess molar amount with respect to the formaldehyde. The use of an excess of formaldehyde causes gelation under some reaction conditions or deteriorates the stability of the powdered product with the lapse of time. After completion of the reaction, the resulting slurry is filtered to separate the polymer, which is then washed and dried to give the desired powdered cation-modified carbamoyl polymer.

The powdered cationic carbamoyl polymer according to the present invention shows a superior flocculating efficiency as it is. It may be also used after quaternization on the amine moiety by reacting with dimethyl sulfate, an alkyl halide or the like. Further, according to the present invention, it is possible to cationize even a carbamoyl polymer having a macromolecular weight of about several tens of millions. It is also possible to obtain a polymer having an optionally adjusted degree of Mannich modification by effecting the aminoalkylation under appropriately selected conditions. The invention is particularly notable in providing a flocculating polymer for use in fields where effective flocculants were not available, e.g., in the treatment of organic slurried waste waters such as sewage, nightsoil or paper making waste water.

The present invention will now be illustrated with reference to the following examples, which are only illustrative and not limitative thereof.

EXAMPLE 1

In a four necked 2 liter flask equipped with a reflux condenser, a thermometer and a stirrer are placed 200 g (2.82 mol) of powdered polyacrylamide having an average molecular weight of about five million, and a mixture of 633 g of acetone and 578 g of water is added thereto. Then, 98.5 g (1.13 mol) of morpholine and 35.7 g (1.13 mol) of 95 percent paraformaldehyde are added thereto while stirring. The resulting mixture is reacted at 40°C for 90 minutes. On completion of the reaction, the mixture is cooled to about 20°C, and the resultant slurry is filtered. The wet cake is washed several times with acetone and dried to give 245 g of powdered cation-modified polyacrylamide.

The cation-modified polymer thus obtained has 21 percent by mol of the degree of Mannich modification.

EXAMPLE 2

As in Example 1, 200 g (2.82 mol) of powdered polyacrylamide having an average molecular weight of about three million five hundred thousand are suspended in a mixture of 840 g of methanol and 360 g of water, and 63.0 g (0.85 mol) of diethylamine and 27.0 g (0.85 mol) of 95 percent paraformaldehyde are added thereto. The resulting mixture is reacted at 40° to 45°C fpr 60 minutes while stirring. On completion of the reaction, the resultant slurry is cooled and filtered. The wet cake is washed with cold methanol and dried to give 230 g of powdered cation-modified polyacrylamide.

The cation-modified polymer thus obtained has 17.5 percent by mol of the degree of Mannich modification.

EXAMPLE 3

The procedure is carried out in the same way as in Example 2 except that 87.5 g (0.85 mol) of diethylaminomethanol is used in place of diethylamine and paraformaldehyde to give 227 g of powdered cation-modified polyacrylamide.

The degree of Mannich modification is 22.0 percent.

EXAMPLE 4

In a four necked 1 liter flask equipped with a reflux condenser, a nitrogen-introducing tube, a thermometer and a stirrer are placed 130 g (1.83 mol) of acrylamide, 340 g of ion exchange water and 161 g of acetone. After a uniform solution is obtained, 0.065 g of potassium persulfate and 0.033 g of sodium bisulfite are added thereto as a polymerization catalyst, and the mixture is subjected to polymerization reaction at 50°C for 4 hours while stirring under a stream of nitrogen gas. On completion of the reaction, the resulting slurry of polyacrylamide (having an average molecular weight of two million) is cooled to 30°C, and 252 g of acetone, 83 g (0.73 mol) of 40 percent dimethylamine and 23 g (0.73 mol) of 95 percent paraformaldehyde are added thereto. Then, the mixture is reacted at 40°C for 30 minutes. Thereafter 41 g (0.37 mol) of 40 percent dimethylamine are added thereto, and the reaction is continued at 40°C for an additional 90 minutes. The resulting slurry is cooled and filtered. The wet cake is washed with acetone and dried to give 158 g of powdered cation-modified polyacrylamide.

The cation-modified polymer thus obtained has 25 percent by mol of the degree of Mannich modification.

EXAMPLE 5

The polymerization and dimethylamination are carried out in accordance with the same procedure as in Example 4 except that 117 g (1.65 mol) of acrylamide and 9.5 g (0.18 mol) of acrylonitrile are employed as monomers to give 150 g of water-soluble cation-modified polymer.

The degree of Mannich modification of the polymer is 23 percent by mol per acrylamide unit.

REFERENCE EXAMPLE

A 0.1 percent aqueous solution of each of the cation-modified polymers obtained in Examples 1 to 5 is prepared, and a 2 percent dispersion (pH 4.4) of kaolin is added to each solution, and the sedimentation velocity of the aggregates is determined using a 100 ml color comparison tube. The results of the determination are shown in the following Table together with a comparative result with a liquid cationic flocculant commercially available.

| Samples | Amount of Polymers added | | |
|---|---|---|---|
| | 1 ppm | 2 ppm | 3 ppm |
| Example 1 | 22.4 | 28.8 | 31.2 |
| Example 2 | 19.5 | 25.8 | 28.3 |
| Example 3 | 22.0 | 26.4 | 30.5 |
| Example 4 | 24.0 | 29.5 | 33.6 |
| Example 5 | 18.7 | 24.0 | 26.5 |
| Liquid flocculant commercially available | 10.4 | 12.3 | 13.2 |

Note: Each number shows the value of sedimentation velocity in a unit of cm/min, and a bland value is nearly zero.

What is claimed is:

1. A process for producing a water-soluble powdered cationic carbamoyl polymer, which comprises reacting a carbamoyl polymer with a formaldehyde and an amine or with an amine-formaldehyde adduct in a mixture of water and at least one organic solvent which is miscible with water and not capable of dissolving said carbamoyl polymer, the water content in said mixture of water and organic solvent being 20 to 70 percent by weight.

2. The process according to claim 1, wherein the carbamoyl polymer is a member selected from the group consisting of polyacrylamide, polymethacrylamide, copolymers of acrylamide and copolymers of methacrylamide.

3. The process according to claim 2, wherein the carbamoyl polymer has an average molecular weight of 100,000 or more.

4. The process according to claim 1, wherein the amine is a member selected from the group consisting of dimethylamine, diethylamine, dibutylamine, diethanolamine, methylaminoethanol, morpholine and piperidine.

5. The process according to claim 1, wherein the formaldehyde is paraformaldehyde, trioxane or aqueous formalin.

6. The process according to claim 1, wherein the organic solvent is a member selected from the group consisting of methanol, ethanol, n-propanol, i-propanol, t-butanol, acetone, acetonitrile, ethyleneglycol, propyleneglycol, dioxane, methylcellosolve and ethylcellosolve.

7. The process according to claim 1, wherein the reaction is carried out at a temperature of 20° to 50°C.

8. The process according to claim 1, wherein the reaction is carried out until the proportion of the aminoalkylated amide groups to the total amide groups (i.e., the degree of Mannich modification) reaches 5 to 50 mol percent.

9. The process according to claim 1, wherein each of the formaldehyde and the amine is used in a proportion of 0.1 to 1.0 mol per mol of the carbamoyl polymer.

10. The process according to claim 1, wherein the concentration of the carbamoyl polymer in the reaction system is 10 to 30 percent by weight.

11. A process for producing a water-soluble powdered, cationic carbamoyl polymer, which comprises reacting a carbamoyl polymer selected from the group consisting of polyacrylamide, polymethacrylamide, copolymers of acrylamide and copolymers of methacrylamide with a formaldehyde and an amine or with an amineformaldehyde adduct in a mixture of water and at least one organic solvent selected from the group consisting of methanol, ethanol, n-propanol, i-propanol, t-butanol, acetone, acetonitrile, ethyleneglycol, propyleneglycol, dioxane, methylcellosolve and ethylcellosolve, the water content in said mixture of water and organic solvent being 20 to 70 percent by weight and the concentration of the carbamoyl polymer in the reaction system being 10 to 30 percent by weight.

12. The process according to claim 11, wherein the water content in the mixture of water and the organic solvent is 30 to 60 percent by weight.

* * * * *